July 14, 1953 F. W. PFLEGER 2,645,422
CARRIAGE POSITION CONTROL MEANS FOR ACCUMULATION
OF PRODUCTS AROUND A FIXED DECIMAL POINT
Filed Feb. 23, 1951 8 Sheets-Sheet 1

Inventor
FREDERICK W. PFLEGER
George V. Hall
Attorney

July 14, 1953 F. W. PFLEGER 2,645,422
CARRIAGE POSITION CONTROL MEANS FOR ACCUMULATION
OF PRODUCTS AROUND A FIXED DECIMAL POINT
Filed Feb. 23, 1951 8 Sheets-Sheet 2

FIG. 2

Inventor
FREDERICK W. PFLEGER
George V. Hall
Attorney

July 14, 1953 F. W. PFLEGER 2,645,422
CARRIAGE POSITION CONTROL MEANS FOR ACCUMULATION
OF PRODUCTS AROUND A FIXED DECIMAL POINT
Filed Feb. 23, 1951 8 Sheets-Sheet 7

Inventor
FREDERICK W. PFLEGER
By George V. Hall
Attorney

UNITED STATES PATENT OFFICE 2,645,422

CARRIAGE POSITION CONTROL MEANS FOR ACCUMULATION OF PRODUCTS AROUND A FIXED DECIMAL POINT

Frederick W. Pfleger, West Orange, N. J., assignor to Monroe Calculating Machine Company, Orange, N. J., a corporation of Delaware Application February 23, 1951, Serial No. 212,215

11 Claims. (Cl. 235—63)

1

The invention relates to carriage position control means for calculating machines. More particularly, the invention relates to control means whereby a shiftable register carriage is automatically positioned for each of a series of calculations respectively, in ordinal relation to values set in factor selection means, so that the sum of the calculations will be accumulated in the register.

The invention is particularly adaptable for use in conjunction with multiplying mechanism of the ten key multiplier type in a full keyboard machine. In such a machine, the multiplicand is set in the keyboard and a selected series of the multiplier keys are sequentially depressed. The product register is mounted in a shiftable carriage and the product is registered therein by differential actuating mechanism which is set in accordance with the values set in the keyboard. The actuating mechanism is cycled in accordance with the value of a depressed multiplier key 1 to 9, followed by a one ordinal shift of the register carriage; or upon depression of the zero multiplier key one ordinal shift of the carriage is effected without registration. Thus, registration and carriage shift is effected upon depression of the selected series of multiplier keys thereby accumulating the product in the register. Multiplying mechanism of the above noted type may be adapted to provide for the sequential depression of the selected multiplier keys from higher to lower orders or vice versa with ordinal shifting of the product register carriage to the left or right respectively. The selected multiplier keys, however, have no ordinal relation to the multiplicand set in the keyboard. Therefore when the sum of the products of a series of multiplying operations is to be accumulated, it is often necessary to begin the several operations with the register carriage in different ordinal positions to correctly relate the product register to the multiplicand set in the keyboard. This results in loss of time and involves considerable mental calculation by the operator.

It is much easier to depress the multiplier keys sequentially from the higher to the lower orders which operation conforms with the reading of the multiplier. Obviously, a series of whole number multipliers will almost invariably include numbers consisting of varying numbers of digits; thus precluding the starting of each of the operations with the carriage in the same ordinal position. The following simple example wherein the sum of the products of two multiplying operations is to be accumulated will be illustrative:

2

(24×2)+(24×34)=864

With 24 set in the keyboard and the carriage in a given position, upon depression of the 2 multiplier key, the product 48 will be registered. If the second calculation is started with the carriage in the same given position and the multiplicand retained on the keyboard in the same position the registration will be as follows:

```
   48
   72
+  96
  ————
 1296
``` which is obviously the incorrect sum of the products. If, however, the second calculation is started with the carriage one ordinal position to the right of the given position, the registrations will be as follows:

```
   48
   72
+  96
 ————
  864
``` which is the correct sum of the two products.

If the ten key multiplying mechanism is adapted for depression of the multiplier keys from to higher orders and the several multipliers comprise whole numbers only, as in the above example, the several calculations may be started with the carriage in the same position. However, should decimals and whole numbers or decimals with varying numbers of digits be included in the multipliers, it will be necessary to locate the carriage in different ordinal positions as illustrated in the foregoing example. Therefore, regardless of whether the left or right shift method is employed, in certain instances, it will be necessary for the operator to mentally determine the proper location of the carriage and to locate it by manipulation of either the zero multiplier key or of a shift key prior to depression of the significant digit multiplier keys.

The present invention in a ten key multiplying machine permits the tabulation of the carriage to the same predetermined position before the start of each of a series of multiplying operations. Then, without further consideration of the position of the carriage, the selected multiplier keys may be depressed and the successive products accumulated in proper decimal relation.

The type of ten key multiplier machine to which the invention is particularly adapted is fully disclosed in Patent No. 2,538,896 issued to E. F. Britten, on January 23, 1951 and copending applications Ser. No. 160,154, of Herman Gang, and Ser. No. 205,304, filed in my name on January 10, 1951, which applications have been indicated as presenting patentable subject matter. In such machines multiplier storage devices are set in accordance with the depressed multiplier keys and the settings are effected as rapidly as it is normally possible to depress the keys. The multiplying operation normally is initiated upon setting of the first multiplier digit and it is unnecessary for the operator to wait until completion of the registration which is controlled by one setting before depression of the next multiplier key. Thus, the setting operations may be effected simultaneously with registration and shift.

The devices of the invention include what may be termed a control or decimal key which is adapted to supersede control of the initiation of the multiplying operations each of which is normally responsive to the depression of the first multiplier key. If the multiplying operations are effected with the left carriage shift, the carriage is returned rightwardly to a given position and the multiplier keys are depressed from higher to lower orders. If the multiplier of the next calculation is or includes a whole number, depression of the multiplier keys representative of the whole number will each effect a one ordinal shift of the carriage further to the right in addition to setting the digits in the storage devices. The decimal key is then depressed to initiate the multiplying operation with left carriage shift and then if there is a decimal in the multiplier the keys therefor are depressed, thus effecting the normal operation of simultaneous setting and calculation. If a multiplier comprises only a decimal, the decimal key is first depressed, which operation conditions the machine for normal initiation of the multiplying operation upon depression of the first multiplier key.

The invention has been disclosed as related to the control of mechanisms in a full keyboard ten multiplier type of machine which is constructed and operates in accordance with the disclosure of applicant's aforesaid copending application, Serial No. 205,304. Such mechanisms include multiplier storage devices, setting means therefor, and registering and carriage shifting means which are controlled by the set storage devices. The devices of the invention relate to tabulating means for the register carriage, control of the carriage shifting means by the multiplier keys prior to initiation of the multiplying operations, and the controls exercised by the aforenoted decimal key. Therefore, the operations of the various mechanisms will be described only in so far as related to the devices of the invention and reference is made to said copending application for the constructional operational details of the mechanisms not specifically disclosed herein.

In the accompanying drawings illustrating the invention:

Fig. 2 is a left side elevation of the machine showing the registration control means, the setting and indexing clutch, and certain of the carriage position control devices;

Fig. 4a is a fragmentary detail elevation of certain parts of Fig. 4 shown in an operated position;

Fig. 9a is a view similar to Fig. 9 with the parts in the position corresponding to the position of the parts shown in Fig. 8a;

Registering operation

Figure 1:
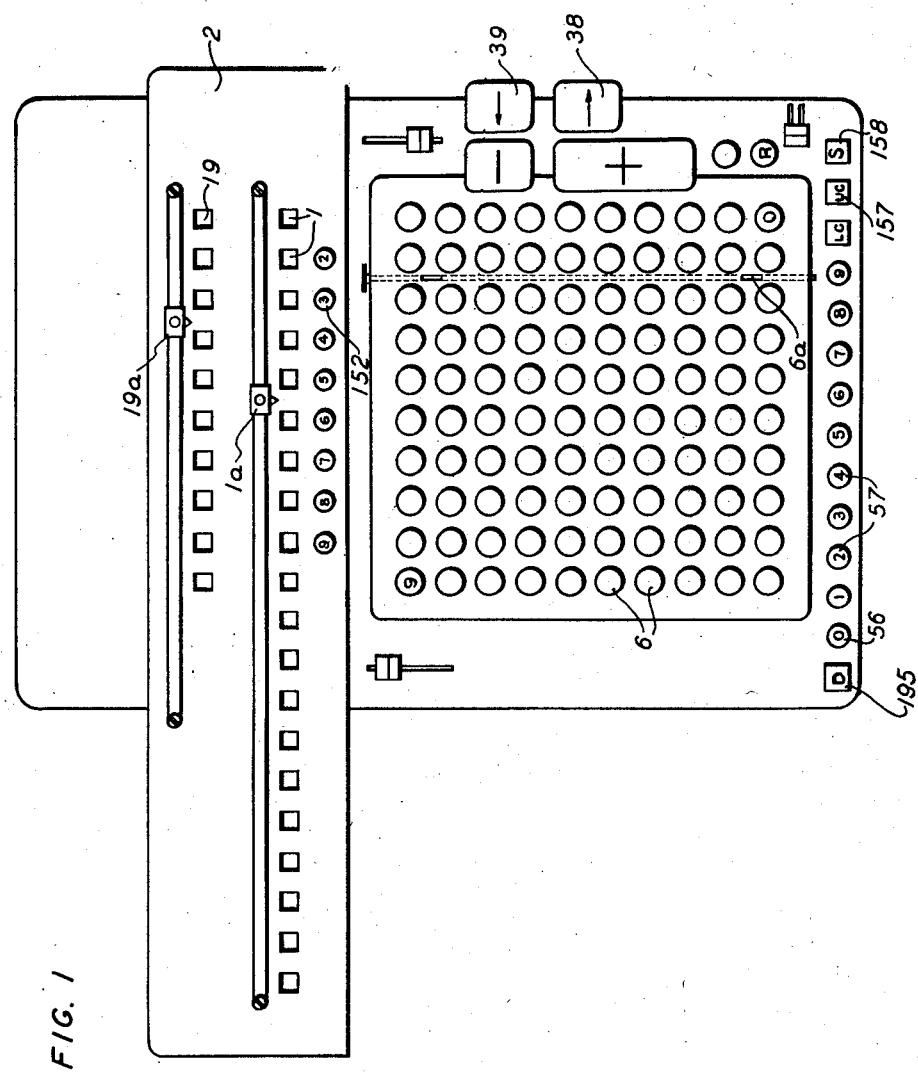
Fig. 1 is a plan view of a calculating machine embodying the invention.
Figure 3:
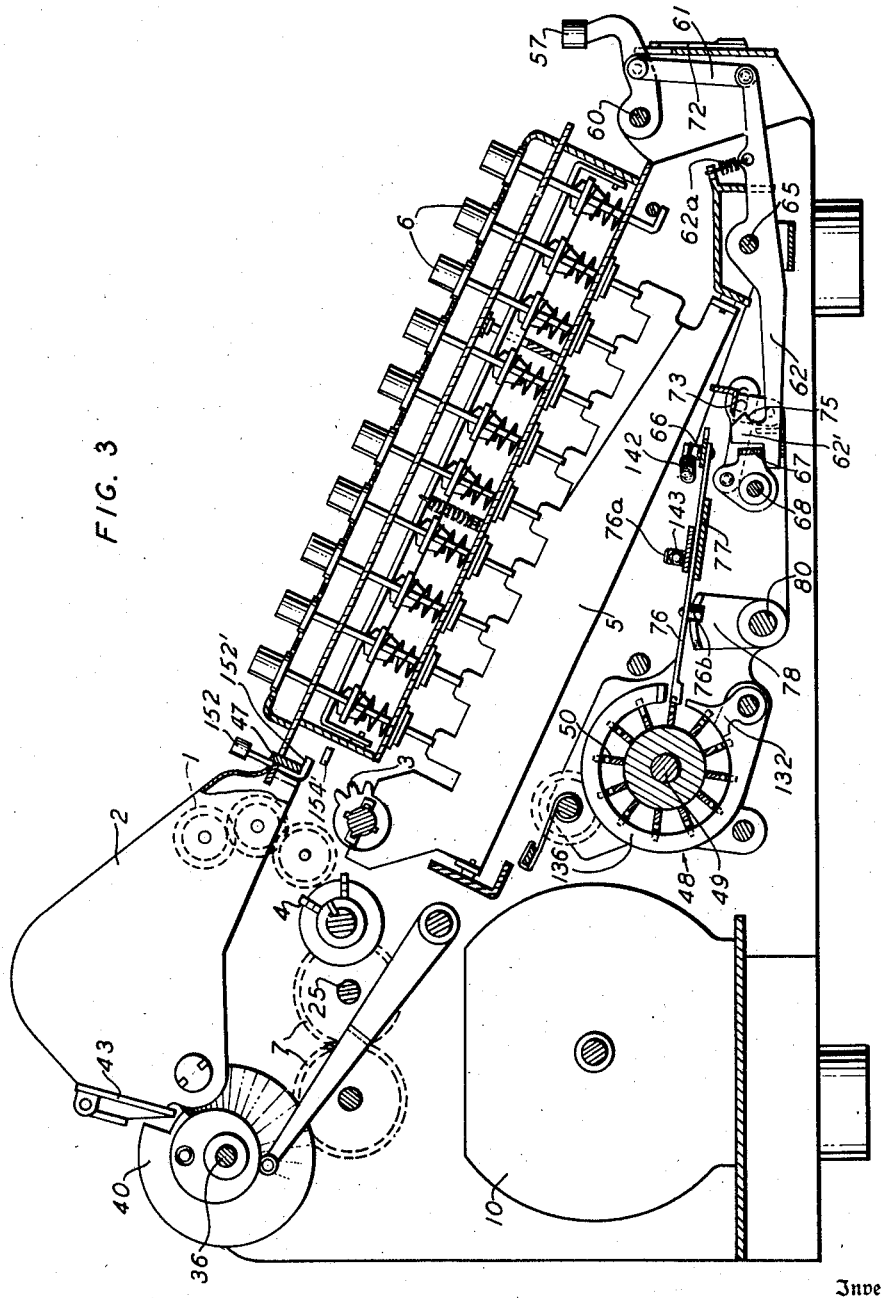
Fig. 3 is a vertical section through the machine showing the registering mechanism and the multiplier storage magazine.

The product dividend register comprising the numeral wheels 1 (Figs. 1 and 2) is mounted in the denominationally shiftable carriage 2. Registration is effected on wheels 1 by cyclically operable actuating mechanism comprising the differentially settable actuators 3 and the tens transfer actuators 4 (Figs. 2 and 3) which are mounted in the base of the machine. The differential actuators 3 are set by selector bails 5 in accordance with depressed settable numeral keys 6 of the keyboard, thereby determining the value registered in wheels 1 upon each cycle of operation of the actuating mechanism.

The differential actuators 3 and tens transfer actuators 4 are driven at a one to one ratio by a gear train 7 from the output gear 8 of the differential clutch mechanism 9 (Fig. 2). The differential clutch mechanism is constructed and transmits power from the motor 10 (Fig. 3) substantially in accordance with the disclosure of U. S. Patent No. 1,566,560, issued to George C. Chase on December 22, 1925. Normally the gearing comprising both working legs of the differential drive rotate idly as described in the aforenoted patent and no movement is transmitted to output gear 8. However, interruption of the movement of one of the legs will cause the planet gears to move in their orbit in one direction accordingly rotating output gear 8 and interruption of the movement of the other leg will cause movement in the other direction and reverse rotation of output gear 8.

The working legs of the differential drive are selectively arrested by means of a reversing clutch lever 11 (Fig. 2) which is fulcrumed on the machine frame and settable to neutral, additive and subtractive positions. Clockwise movement of lever 11 will position it to additive setting whereby a hook arm 12 of said lever will engage a lug 13 on gear 14 forming one leg of the differential drive to interrupt its movement, thereby causing rotation of the output gear 8.

Conversely, counterclockwise movement will position the lever 11 to subtractive setting whereby a hook arm 15 thereof will engage a stop 16 for the other leg of the differential to interrupt its movement and cause rotation of output gear 8 in the reverse direction. Full cycle stopping means for the actuating mechanism includes and operates in conjunction with parts identified in Fig. 2 by reference numerals 20, 21, 22, 25, 27, 28, 30, 31, 32, 33, 34 and 35 not directly referred to and described in the present description but corresponding to like parts identically referenced and described in the aforenoted application #205,304.

Carriage shifting mechanism

The carriage shifting mechanism is constructed and operates substantially in accordance with the disclosure of U. S. Patent No. 1,964,478, issued to Austin A. Overbury on January 26, 1934, to which reference is made for the structural details of the mechanism and its operation.

Figure 4:
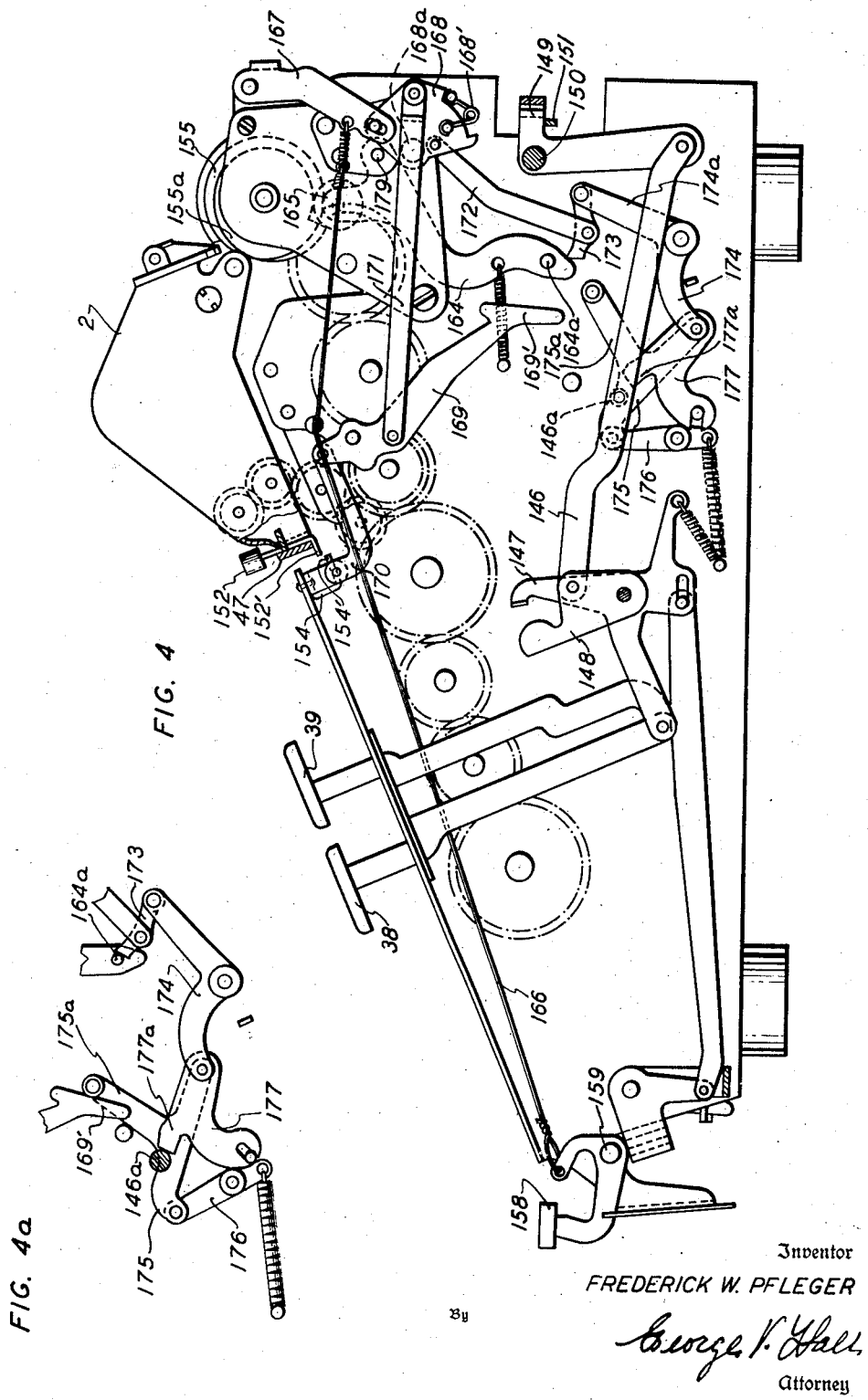
Fig. 4 is a right side elevation of the machine showing the carriage shift initiating means as related to the tabulating means.

A pair of reversely threaded worms 40 and 40a (Fig. 12) each provided with a clutch 41 and 41a respectively, are supported on a shaft 36 which is rotatably mounted in the side frames to the rear of carriage 2. The clutches are selectively engageable to connect the related worm to shaft 36 which is driven by a gear train 37 (Fig. 2) from motor 10, thereby shifting the carriage to the left or to the right respectively. Right and left shift keys 38 and 39 (Figs. 1 and 4) are operable to control the engagement of the shift clutches 41a and 41 respectively. The devices of the invention, however, have been disclosed as operating in conjunction with multiplying mechanism wherein left shift clutch 41 is controlled through independent connections and wherein return carriage shift to the right is initiated through a linkage which is common to the right shift key 38. Therefore, control of the shifting mechanism in connection with the shift keys will be described only in connection with the linkage common to the right shift key 38.

The shift clutches 41, 41a are of well known construction wherein a spring urged pawl mounted on the driven member engages the driving member to connect the drive. A control detent 42 for each shift clutch is normally spring urged into engagement with the pawl of the related clutch to disengage said clutch and moved from engagement to permit the pawl to engage the clutch as hereinafter described. Shift worms 40, 40a, upon rotation, will engage a notched rail 43 (Figs. 3 and 12) which is fixed to the rear of carriage 2, thereby shifting said carriage one decade to the left or to the right respectively upon each cycle of rotation. Upon release, from clutch engaging position, of a detent 42, the detent will be spring urged into engagement with the periphery of the related clutch and when the clutch completes its cycle of operation the detent will engage the clutch pawl to disconnect the drive, thereby terminating the shift.

Upon depression of right shift key 38, link 146 (Fig. 4) is moved toward the front of the machine by engagement of crank 147 with crank 148 to which the link is attached. However, link 146 and crank 148 may be moved independently of crank 147 and key 38 as hereinafter described. Link 146 is connected at its rear to a depending arm at the right end of a bail 149 which is rotatably mounted on a shaft 150 and the opposite end of the bail is integral with detent 42 of right shift clutch 41a. Therefore bail 149 and detent 42 will be rocked clockwise (Figs. 4 and 12) to engage clutch 41a and upon release of the shift key the spring of the detent will restore the parts to disengage the clutch.

Figure 10:
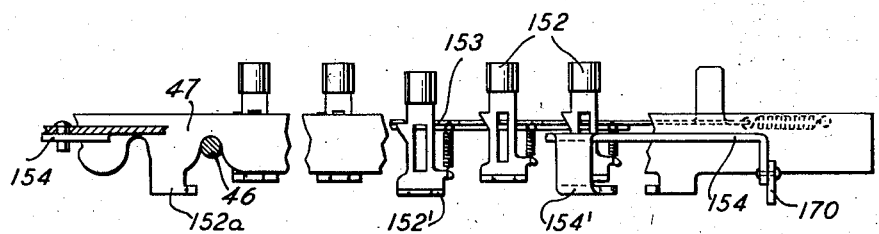
Fig. 10 is a fragmentary detailed front view of the tabulating keys and parts associated therewith.

Means are provided to positively locate carriage 2 in its shifted position. Such means comprises a linkage 44 connected with a bail 151 also which is rotatably mounted on shaft 150 and which underlies and is engaged by bail 149. The forward end of linkage 44 has connection with a depending arm of a bail 45 and a locating rod 46 (Figs. 2 and 12) is engaged at its forward end by an upstanding forked arm 45' of said bail. Rod 46 extends toward the rear of the machine where its tapered free end normally engages one of a series of notches in a rail 47 (Fig. 10) fixed across the front of carriage 2. Upon clockwise movement of bail 149 to engage clutch 41a, bail 151 will likewise be moved, thereby moving bail 45 counterclockwise through linkage 44 to move rod 46 from engagement with the related notch of rail 47, thereby releasing the carriage for the shifting operation. Upon movement of detent 42 to terminate the shift, rod 46 will be moved into engagement with a notch of rail 47, thereby definitely locating the carriage in its shifted position. The detent 42 of left clutch 41 is integral with a bail also overlying bail 151, and bail 45 will therefore be operated in like manner to operate rod 46 in a left shift operation.

Multiplier storage magazine and multiplication

The product is registered in product-dividend wheels (Fig. 3) by repeated addition of the multiplicand which is set in the differential actuators 3 by depression of keys 6 of the keyboard.

Figure 7:
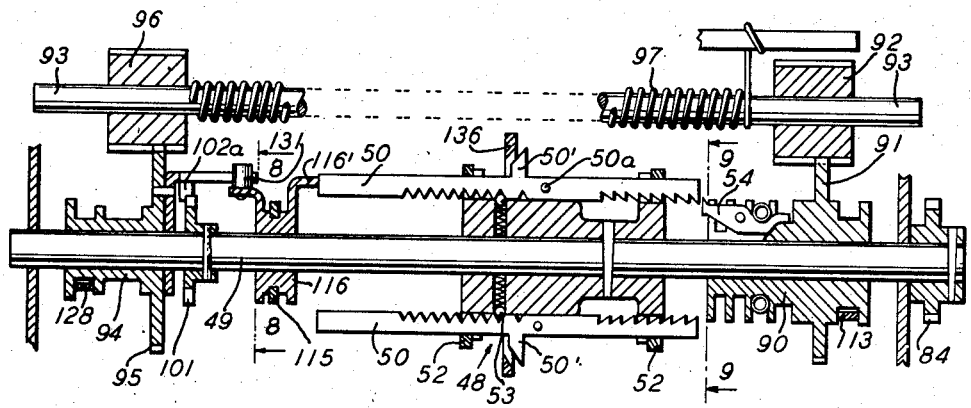
Fig. 7 is a longitudinal section through the multiplier storage magazine.

A substantially spool shaped multiplier storage magazine generally designated by the reference numeral 48 (Figs. 3, 5, and 7) and devices operating in conjunction therewith control the program of multiplication, including the initiation thereof, the registering and carriage shifting operations, and the termination of the program upon completion of the last registering and carriage shifting operations.

The storage magazine is axially fixed on shaft 49 which extends transversely of the machine and is journaled adjacent its ends for rotation in the machine framing. The storage magazine includes a plurality of storage slides 50, each settable to digit representing positions and to a zero position. The slides are equidistantly spaced about the periphery of the magazine which is adapted to be indexed step by step in counterclockwise direction (Figs. 3 and 5), thereby bringing the slides successively into setting position. A setting and indexing clutch 58 (Fig. 2) is engaged for a single cycle of operation upon depression of any one of the digit value multiplier keys 57 or the zero key 56. During the first half cycle of clutch 58, the slide 50 which is in setting position is adjusted in accordance with the depressed multiplier key and during the last half cycle of the clutch, magazine 48 is indexed one step, thereby bringing another slide into setting position.

Figure 9:
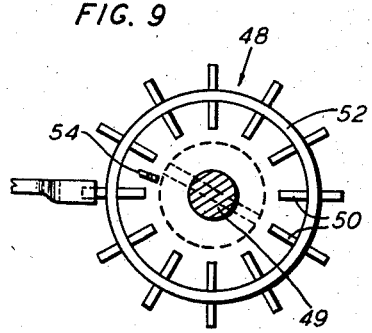
Fig. 9 is a view taken on line 9—9 of Fig. 7 with the parts in the position corresponding to the position of the parts shown in Fig. 8.
Figure 9A:
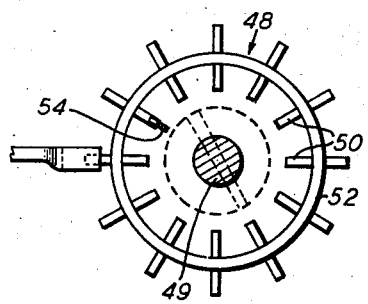

A counting pawl 54 is rotatably mounted on shaft 49 with its active end in a plane a slight distance to the right of slides 50 when they are unset and is normally spring urged clockwise (Fig. 5) counterclockwise (Figs. 9 and 9a) to a home position. When in home position, pawl 54 is located clockwise (Fig. 9) out of longitudinal alignment with the slide 50 which is in setting position so that the slide may be set toward the right (Fig. 7) without interference from the pawl. During a partial indexing step of magazine 48, upon depression of the first multiplier key in a program of multiplication, the slide 50 which has been set during the first half cycle of clutch 58 will be moved from setting position into operating relation with pawl 54 which then will be moved with the set slide from home position (Fig. 9a) as the magazine completes the indexing step of movement.

According to applicant's disclosure of copending application, Serial No. 205,304, upon movement of pawl 54 from home position, the program of multiplication will be initiated and counting pawl 54 will operate in conjunction with the aligned slide, if set to a position representative of 1 to 9, to control registration which will be followed by a leftward carriage shift of one decade. If, however, the slide is set to a zero representing position, a contact member 116' of collar 116 (Figs. 5 and 7) which is rotated in fixed relation with pawl 54 will, in conjunction with the slide, operate to effect a one decade carriage shift in lieu of registration and shift. The subsequent setting and indexing operations upon successive depression of the multiplier keys may be effected concurrently with the registering and carriage shifting operations incident of the calculation; pawl 54 and contact member 116' being moved with the magazine as it is indexed. However, during the carriage shifting operation incident to the control of pawl 54 or member 116' in conjunction with the related slide, suitable escapement means are operated to release pawl 54 and member 116' for one step of reverse movement and thus positioning it in operating relation with the next set slide 50. The calculation will continue until pawl 54 and member 116' are reversely moved to the home position, at which time the product registration will have been completed; or the calculation will have been effected more rapidly than the setting and indexing operations. In either instance, the multiplying operation will be concluded but will be resumed upon further setting and indexing operation and the consequent movement of pawl 54 and member 116' from home position.

A preferred embodiment of the present invention is disclosed as applied to the afore briefly described multiplication control devices, fully disclosed in applicant's application, Serial No. 205,304 in which the description refers to parts identified by reference numerals 50', 52, 62', 64', 64a, 66, 66', 72, 73, 74, 75, 76, 76a, 76b, 77, 78, 79, 85, 105, 106, 107, 108, 109, 110, 112, 113, 113a, 114, 115, 117, 118, 119, 120, 124, 125, 128, 129, 131, 132, 134, 134', 135, 136, 140, 142, 143, and 144 which reference numerals are applied to like parts on the drawings of the present application but not directly referred to in the description. The devices of the present invention, as heretofore noted, provide carriage position control devices operating in conjunction with the multiplier keys prior to the initiation of a program of multiplication. The invention relates to the initiation of the program and the operations performed prior thereto. The storage of the multiplier digits and the program of multiplication per se, other than the initiation thereof bears no relation to the invention. Therefore, the devices of the aforenoted application will be described in detail only in connection with the initiation of a program of multiplication and the superseding control thereof as effected by the devices of the invention.

*Multiplication (initiation of the operation)*

The zero and digit value 1 to 9 multiplier keys, 56, 57 (Figs. 1 and 5) are arranged in sequence from left to right across the machine in front of the keyboard. As heretofore noted, the setting and indexing clutch 58 (Fig. 2) is engaged for a single cycle of operation upon depression of any one of the multiplier keys and the program of multiplication normally is initiated as an incident to the first indexing operation.

Clutch 58 is of well known construction in which a spring urged pawl mounted on the driven member of the clutch is engaged by a detent 59 to disengage the clutch. The clutch is engaged by movement of the detent 59 to release the pawl which will then engage the driving member of the clutch which is entrained with the motor, thereby connecting it with the driven member. Detent 59 is rocked clockwise to engage clutch 58 upon depression of the zero value key 56 or any one of the digit value keys 57 and, upon release of the depressed key, the detent will be urged against the periphery of the clutch to engage the clutch pawl upon completion of the cycle to disengage the clutch. Clutch 58 must be limited to one cycle of operation upon depression of each multiplier key. The action, however, of setting clutch 58 is so rapid that the operator is usually unable to release the multiplier key before the clutch has completed its cycle. Therefore, an auxiliary detent 59' is spring urged into engagement with the periphery of clutch 58 upon movement of detent 59 to engage the clutch.

The zero value key 56 and the one to nine value multiplier keys 57 have horizontally disposed stems (Figs. 3 and 5) which are rotatably mounted at their rearward ends on a shaft 60 which extends across the machine and which is rotatably mounted in the side frames. Intermediate their ends, the key stems have depending link connection 61 with the forward ends of digit selection levers 62. The stem of zero key 56 is fast on shaft 60 and a forwardly extending arm, also fast on the shaft, has depending link connection with the forward end of a zero selection lever 64. Selection levers 62, 64 are mounted on shaft 65 which is journaled in the machine framing and said levers will be described only in connection with the operation of clutch 58 as heretofore noted, the setting means operable in conjunction with selection means during the first half cycle of the clutch has no cooperative relation with the devices of the invention.

Upon depression of the zero key 56 or any one of the digit value keys 57, the connected selection lever 64 or one of the levers 62 respectively will be rocked in clockwise direction (Figs. 3 and 5), thereby raising the rear free end of the lever which movement operates to engage clutch 58 in the following manner.

The free ends of the selection levers 62, 64 underlie the lower edge of a bail 67 which extends transversely of the machine. Rearwardly extending arms of bail 67 are fixed on a shaft 68 which is rotatably mounted in the machine framing (Fig. 2) and extends outwardly from the left side frame. Therefore, when a selection lever 62, 64 is rocked upon depression of a multiplier key, the free rear end of the lever will engage bail 67 and rock said bail and shaft 68 to which it is fixed in counterclockwise direction against the tension of a spring 67' attached to the right end of the bail. Outwardly of the left side frame, a crank 69 with diametrically disposed arms is fixed on the end of shaft 68. The upper arm of crank 69 has link connection 70 with detent 59 of clutch 58 and the lower arm of the crank has yieldable link connection 71 with the auxiliary detent 59'. Crank 69, which will be rocked with shaft 68, will therefore move link 70 toward the rear of the machine and rock detent 59 clockwise to engage clutch 58. At the same time, crank 69 will move link 71 toward the front of the machine, thereby rocking detent 59' counterclockwise into engagement with the periphery of clutch 58 and tensioning a spring 71' which comprises the yieldable connection of the link with the detent. Therefore, if a multiplier key is held depressed until clutch 58 approaches full cycle position, detent 59' will be moved inwardly to a cut-away portion of the clutch housing and thereby engage the clutch pawl to disengage the clutch. Upon release of the depressed multiplier key, the connected one of the digit value selection levers 62 or the zero selection 64 will be moved to normal by a return spring 62a with which each lever is provided and the key will therefore be raised to normal by the connecting linkage. Bail 67 will now be allowed movement to normal by spring 67' and thus crank 69 will be rocked clockwise to the normal position shown in Fig. 2. Accordingly, link 70 will move detent 59 to clutch disengaging position and link 71 will move detent 59' to clutch engaging position. Clutch 58, however, will remain disengaged as a slight step of movement of the clutch will bring its pawl into contact with detent 59.

An upstanding crank 81 (Fig. 2) is fixed on a shaft 80 which is journaled in the machine framing and which extends outwardly from the left side frame. Crank 81 is fixed to the left end of shaft 80 and has link connection 82 with the driven housing of clutch 58. Therefore, upon each cycle of operation of clutch 58, crank 81 and shaft 80 will be rocked clockwise and return. The setting operation will be performed upon said clockwise movement of shaft 80 and upon return movement the storage magazine will be indexed thereby normally initiating the program of multiplication as follows:

An indexing pawl 86 (Fig. 5) is mounted on an arm 87 of ratchet wheel 84 which is fixed on shaft 49. Pawl 86 engages a tooth of ratchet 84 and arm 87 has link connection 88 with an upstanding crank 89 which is fixed on rock shaft 80. When shaft 80 is rocked clockwise by the setting operation of clutch 58, pawl 86 will be rocked in the same direction by the connecting linkage and thus moved one tooth space on ratchet 84 which is held stationary by a detent 83. Therefore, when shaft 80 is rocked counterclockwise to normal by clutch 58, pawl 86 will be effective to index ratchet 84, shaft 49, and magazine 48 one step of movement, thus bringing another slide 50 into setting position.

Figure 5:
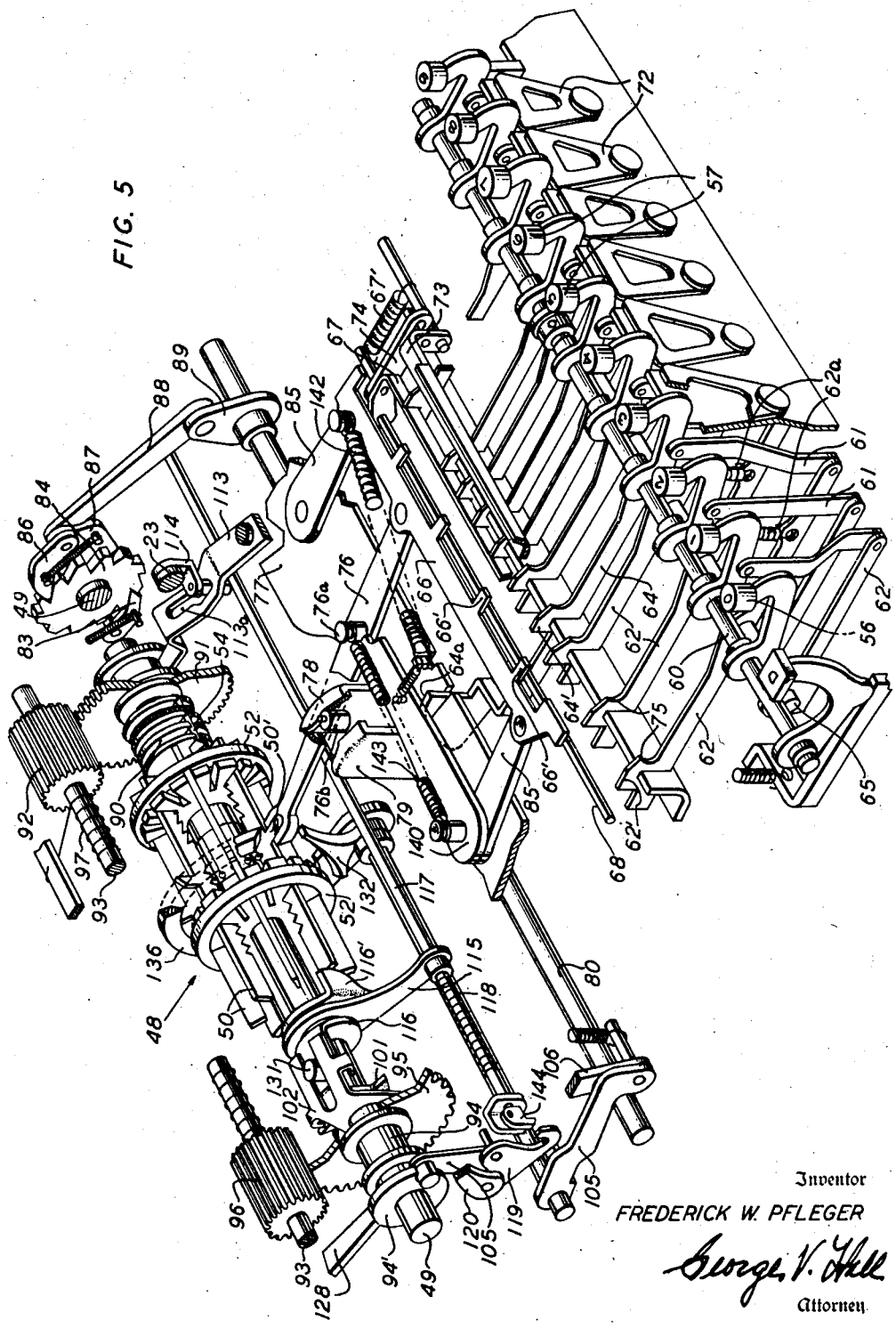
Fig. 5 is a perspective view of the multiplier storage magaine and controls therefor.
Figure 6:
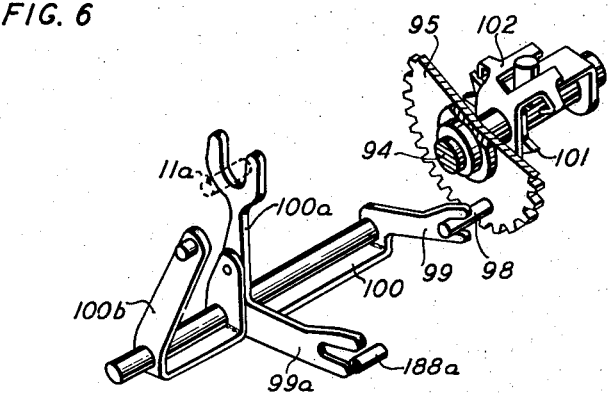
Fig. 6 is a detailed fragmentary perspective of parts shown in Fig. 5 associated with devices of the invention.
Figure 8:
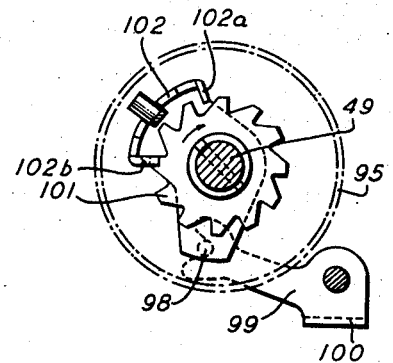
Fig. 8 is a view taken on line 8—8 of Fig. 7 looking in the direction of the arrows.
Figure 8A:
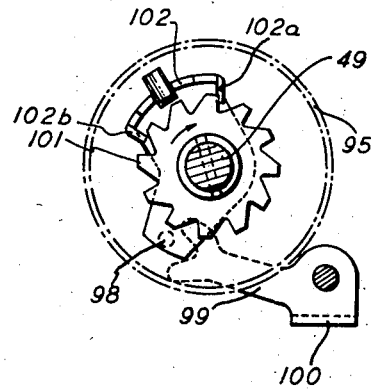
Fig. 8a is a view similar to Fig. 8 with the parts in another position.

As heretofore noted, counting pawl 54 is moved from a home position during the above described initial indexing operation of clutch 58. Pawl 54 (Fig. 7) is mounted in a longitudinal slot in a sleeve 90 which is rotatably and slidably mounted on shaft 49 to the right of magazine 48. A gear 91 is integral with sleeve 90 and meshes with a gear 92 which is fixed on a shaft 93 journaled in the machine framing in parallel relation with magazine 48. To the left of magazine 48 and also rotatably and slidably mounted on shaft 49 is a second sleeve 94 having a gear 95 integral therewith. Gear 95 meshes with a gear 96 which is fixed on shaft 93. A torsion spring 97 has one end attached to shaft 93 and the other end to the machine framing. Torsion spring 97 urges shaft 93 and gears 92, 96 fixed thereon counterclockwise (Fig. 5). Gears 92, 96 therefore urge gears 91, 95 and counting pawl 54, which are in fixed rotational relationship, clockwise on shaft 49. When the machine is in a normal position of rest, gears 91, 95 and pawl 54 are urged to the home position by spring 97 and are so located and restrained from further clockwise movement by a restraining pin 98 (Figs. 6 and 8) on the outer face of gear 95 engaging the fork end of an arm 99 of a bail 100.

An escapement wheel 101 is fixed on shaft 49 to the right of gear 95. Fixed on the inner face of gear 95 adjacent wheel 101 and therefore in fixed rotary relation with pawl 54 is an escapement pallet 102 comprising arms 102a and 102b. When the parts are in normal home position, arm 102a is in the path of movement of one of the teeth of wheel 101 and is angularly displaced from said tooth a distance equal to the angular displacement of counting pawl 54 from the slide 50 which is then in setting position. Therefore, when magazine 48 has been moved, in the initial indexing operation, the distance sufficient to bring the set slide 50 into alignment with pawl 54, a tooth of wheel 101 will engage arm 102a of pallet 102, thereby moving entrained gears 95, 96, 92, 91 and counting pawl 54 with magazine 48 during the remainder of the initial indexing movement. Upon subsequent indexing movements, wheel 101, through pallet arm 102a, will be effective to move counting pawl 54 a full step of movement with magazine 48 unless said pawl has been returned reversely to home position, in which instance the above-described operations will be repeated upon depression of a multiplier key.

Upon movement of gear 95 from home position and the consequent movement of pin 98 from engagement with the forked end of arm 99 of bail 100, the bail will be operated to move clutch lever 11 to clutch engaging position, thereby initiating the program of multiplication. Bail 100 (Figs. 2 and 6) extends to the outside of the left side frame and is thereat provided with an upstanding arm 100a having a forked free end which embraces a pin 11a on clutch lever 11. Attached to and extending outwardly from arm 100a is a second upstanding arm 100b. Arm 100b has toggle spring connection 103 with a two position lever 104. When lever 104 is in the counterclockwise position shown in Fig. 2, toggle spring 103 biases bail 100 counterclockwise. Normally, bail 100 is held in central inactive position by pin 98 engaging the fork 99 of the bail. However, when pin 98 is removed from fork 99 during the initial indexing operation, toggle spring 103 will be effective to rock bail 100 counterclockwise and fork arm 100a will engage pin 11a, thereby rocking clutch lever 11 clockwise to engage clutch 9. If lever 104 is set clockwise from the position shown in Fig. 2, toggle spring 103 will bias bail 100 in the reverse direction, thereby providing for negative multiplication.

The aforedescribed control of the normal initiation of the program of multiplication is superseded by the devices of the invention which operate to tabulate the carriage rightwardly to a predetermined position and concurrently to set the superseding control devices by which the normal program initiating means is disabled.

*Tabulating means and setting of superseding control means*

Figure 11:
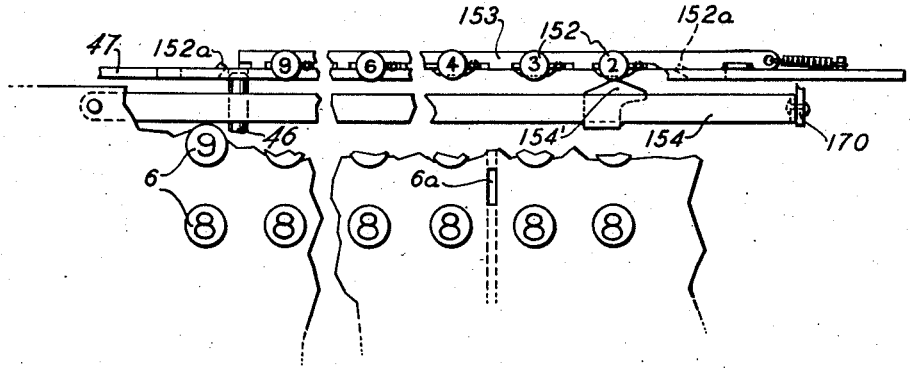
Fig. 11 is a fragmentary top plan of the tabulating means shown in Fig. 10.

The tabulating keys 152 (Figs. 4, 10 and 11) one for each order, intermediate the extreme right and left carriage shift positions, are located at the front of carriage 2. The keys are spring retracted and are provided with a latching plate 153 to hold a depressed key against retraction. The plate is of well known construction wherein the depression of a key operates to release any other set keys. Each key 152 has a forwardly extending lug 152' at the lower end of its stem. A shift terminating arm 154 is pivotally mounted at its left end on the rear underside of the keyboard and a lug 154' of the arm is adapted to cooperate with the lug 152' of a depressed key 152 to terminate a shift in the indicated position. If all of the tabulating keys are retracted and the carriage is to be shifted into the right end position, a fixed lug 152a on the carriage rail 47 similar to lugs 152' will cooperate with lug 154' to terminate the shift. Lug 152a is fixed in the plane of the lug 152' of a depressed key 152 and it will be understood that the operation is the same as hereinafter described in connection with lugs 152'. Upon depression of a key 152, its lug 152' is lowered into the plane of the lug 154'. Normally, lug 154' is forwardly and out of the path of movement of the lug 152' of a depressed key 152 and is ineffective to terminate a shift. However, upon initiation of a right carriage shift in conjunction with the setting of the controls of the invention, lug 154' is moved into the path of movement of the lug 152' of a depressed key 152 to terminate the shift in the following manner.

An auxiliary clutch 155 (Figs. 4 and 12) which is constructed and operates in accordance with shift clutches 41 and 41a has common mounting with the shift clutches on motor driven shaft 36 which furnishes the power for the clutches. A spring urged detent 156 operates to engage and disengage clutch 155 in the manner described in connection with detents 42 of clutches 41, 41a. Clutch 155 is engaged upon depression of a key 157 and operates to initiate a right carriage shift only if key 158 is simultaneously depressed. Clutch 155 may be further utilized to effect a clearing operation for the multiplier-quotient register. This operation, however, would be incidental to the operation of the devices of the invention. It will be apparent, therefore, from the following description that key 158 could be provided with the well known overlapping arrangement whereby depression of key 158 would simultaneously depress key 157 but permit the independent depression of key 157.

Spring retracted key 157 is rockably mounted on a shaft 159 and the stem of the key has a depending arm which has link connection with a lever 157a, an upstanding arm of which is provided with a pin 160 extending to the side thereof. A link 161 has a longitudinally extending slot at its forward end and the forward end of the link is spring urged downwardly thereby normally engaging a shoulder at the rear of the slot with pin 160. Link 161 extends toward the rear of the machine and thereat has connection with a depending arm 162 at the left end of a bail 163 which is rockably mounted on shaft 150. Detent 156 of clutch 155 is integral with the right end of bail 163. Upon depression, key 157 will be rocked counterclockwise thereby moving link 161 toward the front of the machine and rocking bail 163 and detent 156 clockwise to engage clutch 155. Near the end of the counterclockwise movement of key 157, a rearwardly extending arm of lever 157a will engage and raise the forward end of link 161 thus removing the shoulder of its slot from engagement with pin 160. Link 161 will now be allowed rearward movement by its slot should key 157 be held depressed. Spring urged detent 156 will therefore be rocked to clutch disengaging position thus limiting the operation of clutch 155 to a single cycle.

The driven member of clutch 155 is provided with a cam 155a. A downwardly extending shift initiating arm 164 is fixed on the right end of a shaft 179 pivotally mounted in the machine framing and the arm is spring urged clockwise, thereby engaging a roller 165 thereon with cam 155a. When clutch 155 is in full cycle position, roller 165 will engage the low portion of cam 155a and upon rotation of the cam by clutch 155, arm 164 will be rocked counterclockwise until roller 165 engages the high portion of the cam near the end of the cycle of the clutch. As clutch 155 moves into full cycle position, arm 164 will be spring restored clockwise, thereby moving roller 165 from the high to the low portion of the cam. The above described movement of shifting initiating arm 164 will be ineffective unless key 158 has been depressed.

Key 158 (Fig. 4) is fixed on shaft 159 adjacent key 157 (Figs. 1 and 12) and will, upon depression, rock the shaft counterclockwise to effect certain adjustment hereinafter described. Key 158 has an upstanding arm to which a cable 166 is fixed. The cable runs toward the rear of the machine through a suitable guide and at its rear has yieldable spring connection with a depending arm 167 which has pivotal mounting at its upper end. The lower end of arm 167 has slot and pin connection with a toggle plate 168 which normally is held in clockwise position by a toggle spring 168' and is pivotally mounted at 168a on the right side frame. A crank 169 is mounted on the right side frame forwardly of toggle plate 168. Crank 169 comprises a relatively short upstanding arm and an elongated depending arm the free end of which comprises a toe 169'. The upstanding arm of crank 169 has at its upper end link connection 170 with the right end of arm 154 of the tabulating mechanism and the depending arm of the crank has link connection 171 intermediate its end with toggle plate 168. Toggle plate 168 also has link connection 172 with an arm 173. Arm 173 is horizontally disposed and has pivotal mounting at its right end on the upper end of a crank arm 174a of the right link 174 of a toggle 174—175. The left free end of arm 173 is adapted for engagement by a pin 164a at the lower end of arm 164 but is normally out of the path of movement thereof. The left link 175 of the toggle has pivotal connection at its left end with an arm of crank 176 which is spring biased clockwise thereby normally holding toggle 174—175 collapsed. A link 177 has pivotal mounting at the point of connection of toggle links 174—175 and at its left end link 177 has slot and pin mounting on the machine frame. Link 177 has an operating finger 177a which is adapted to engage a pin 146a on right shift initiating link 146 when toggle 174—175 is moved from collapsed to set position. Upon depression of key 158 cable 166 will be moved toward the front of the machine thereby rocking arm 167 clockwise and connected toggle plate 168 counterclockwise in which position the plate will be held by its toggle spring. The counterclockwise movement of toggle plate 168 will move link 171 toward the front of the machine to rock crank 169 clockwise and will raise link 172 thereby rocking the free end of arm 173 into the path of movement of pin 164a of arm 164. The clockwise movement of crank 169 will move link 170 toward the rear of the machine thereby rocking arm 154 to move its lug 154' rearwardly and into the path of movement of the lug 152' of a set tabulating key 152. It will be noted that should the carriage be in a position selected by depression of a tabulating key, the above described adjustments will not be effected because a slight movement of the parts will engage lug 154' of arm 154 with the lug 152' of the set tabulating key thus preventing further movement of the parts. Therefore, upon operation of clutch 155 and the rocking of shift initiating arm 164, pin 164a will pass idly above arm 173 and no carriage shift will be initiated. The yieldable connection, however, at the rear of cable 166 will permit depression of key 158 and the consequent rocking of shaft 159 to which it is fixed.

With the foregoing described adjustments effected, operation of clutch 155 and the attendant counterclockwise movement of arm 164 will be effective to initiate a rightward carriage shift. Upon counterclockwise movement of arm 164, pin 164a will engage arm 173 and thereby rock toggle link 174 about its pivotal mounting at its right end on the side frame. Toggle 174—175 therefore will be moved to its set position as shown in Fig. 4a. As toggle 174—175 is moved to set position, associated link 177 will be rocked counterclockwise about its slot and pin mounting on the machine frame to engage its finger 177a with pin 146a thereby moving link 146 forwardly to initiate a right carriage shift as described in connection with the shifting mechanism. Finger 177a will hold link 146 forwardly to maintain shift clutch 41a engaged until toggle 174—175 is broken upon which the shift will be terminated as follows:

When toggle 174—175 is set, a roller at the end of an arm 175a of link 175 will be moved into position adjacent the toe 169' of crank 169 as shown in Fig. 4a. As the carriage approaches and is immediately adjacent the position of a depressed tabulating key 152, the lug 152' of the key will engage lug 154' of lever 154 thereby rocking the lever and moving link 170 forwardly. The forward movement of link 170 will restore crank 169 counterclockwise and thereupon toe 169' will engage the roller at the end of arm 175a of toggle link 175 thereby moving the link clockwise to break the toggle 174—175. Upon collapse of toggle 174—175 link 177 will be moved from engagement with pin 146a thereby permitting rearward movement of link 146 and movement of detent 42 of right shift clutch 41a to disengage the clutch upon completion of the shift into the position indicated by the depressed tabulating key 152. Furthermore when crank 169 is restored, link 171 will move toggle plate 168 to normal thereby restoring arm 167, key 158 through cable 166, link 172 and arm 173. Should key 158 be held depressed until the normalizing operations have been effected, the spring connection of cable 166 with arm 167 will be tensioned and thus will restore the key upon release.

When shaft 159 (Figs. 4 and 12) is rocked counterclockwise upon depression of key 158, certain control devices of the invention are set so that subsequent depression of a multiplier key 56, 57 will not result in the aforedescribed initiation of a multiplying operation upon the consequent movement of pawl 54 from home position in the setting and indexing operation. Rather, the depression of a multiplier key will cause a single order shift of the carriage further toward the right from the position to which it has been tabulated and restraining means will be effective to hold in abeyance the initiation of the multiplying operation.

Upon counterclockwise movement of shaft 159, a crank 178 (Fig. 12) fast thereon will move a link 180 rearwardly. The rear end of link 180 has connection with one arm of a bell crank 181 which is pivotally mounted on shaft 179 on which shift initiating arm 164 (Fig. 4) is fixed. Therefore, upon rearward movement of link 180, bell crank 181 will be rocked clockwise. The other arm of bell crank 181 has link connection 182 through a stud 181a with the rear arm of a lever 183 which is fulcrumed on an upstanding arm of a three armed crank 184. Clockwise movement of crank 181, therefore, will lower link 182, thereby rocking lever 183 about its pivot on crank 184 to raise the forward free end of the lever to the rear of and into the path of movement of a pin on a crank 185a which is fixed on shaft 179.

Cam 155a which is operated by clutch 155 is provided with a dwell extending from its low toward its high portion and will therefore not be effective to rock shift initiating arm 164 (Fig. 4) during the first portion of the cycle of clutch 155. This arrangement is to insure that the aforedescribed adjustment of lever 183 is effected before arm 164 is rocked. When arm 164 is rocked counterclockwise by cam 155a, shaft 179 on which the arm is fixed will likewise be rocked and with it crank 185 (Fig. 12) fixed thereon. The pin of crank 185a will therefore engage the free end of lever 183 and rock the three arm crank 184 clockwise.

A depending arm of crank 184 is connected to the rear end of a forwardly extending link 185 which at its forward end is attached to an upstanding crank 186 which is fixed on a shaft 187 journaled in the machine framing. Therefore upon clockwise movement of crank 184, link 185 will be moved forwardly thereby rocking crank 186 and shaft 187 counterclockwise. A crank 188 having a pair of vertically disposed arms also is fixed on shaft 187 and the upper arm of the crank has pin and slot connection with a spring retractable slide 189. The lower arm of crank 188 has an outwardly extending restraining pin 188a normally disengaged from the forked end of arm 99a (Figs. 6 and 12) which is integral with bail 100 and which is of similar construction to forked arm 99 also integral with the bail. Crank 188 fixed on shaft 187 will be rocked counterclockwise therewith and will move slide 189 forwardly and will move its pin 188a into engagement with the forked end of arm 99a thereby restraining bail 100 from movement to initiate the multiplying operation. Upon forward movement of slide 189, a latching bar 190 which is pivotally mounted at its rear on shaft 187 will be spring urged upwardly at its forward end thereby engaging a shoulder 190a thereof with the downwardly turned forward end of slide 189. Latching bar 190 now will prevent retraction of slide 189 by its spring when shift initiating arm 164 is restored upon completion of the operation of clutch 155 and pin 188a will be held in engagement with the forked end of arm 99a.

Other control devices operating in conjunction with the carriage shifting mechanism are adjusted to active position upon operation of shift initiating clutch 155 and the aforedescribed attendant clockwise movement of crank 184 as follows:

A shaft 122 (Figs. 2 and 12) is rotatably and longitudinally movable in the machine side frames. A collar 191 is fixed on shaft 122 and is spring engaged to urge shaft 122 toward the right to its normal position. A pair of members comprising triggers 123 and 123a are fixed on shaft 122. When shaft 122 is in its normal right position, trigger 123 is effective to engage a lug on the detent 42 of left shift clutch 41 when the shaft is rocked and trigger 123a located to the right of a lug of the detent 42 of right shift clutch 41a will be ineffective. Trigger 123 and shaft 122 are rocked by a crank 121 (Figs. 2 and 12) splined on the shaft, by link 111 and arm 24 to effect a one decade left carriage shift in the program of multiplication fully disclosed in applicant's aforesaid application Ser. No. 205,304.

A rearwardly extending arm of crank 184 (Fig. 12) has pivotal connection with a vertically adjustable slide 192 having slot and pin mounting. The upper end of slide 192 has a cam slot 192a which is engaged by a pin fixed to a plate 193 loose on shaft 122 and engaged by spring urged collar 191. When slide 192 is in normal position cam slot 192a locates plate 193 longitudinally on shaft 122 so that collar 191 spring urged against plate 193 will locate shaft 122 in its normal rightward position. Upon clockwise movement of crank 184, slide 192 will be lowered and cam slot 192a will adjust plate 193, collar 191, shaft 122 and triggers 123, 123a to the left. Accordingly, when shaft 122 is rocked trigger 123 now will be ineffective and trigger 123a will be effective to engage the lug of detent 42 of right shift clutch 41a thereby engaging the clutch.

A cam 58a (Fig. 2) is mounted on the driven member of setting and indexing clutch 58. A depending arm 194 is fixed on shaft 122 outwardly of the left side frame and when shaft 122 is in its normal right position, a roller on the lower end of arm 194 is located inwardly from the plane of cam 58a. However, when shaft 122 is adjusted to the left, the roller of arm 194 will be moved into position to be engaged by cam 58a when clutch 58 is operated thereby rocking arm 194, shaft 122 and trigger 123a to initiate a right carriage shift.

Operation

The operation will best be understood from a specific example wherein a sum of a plurality of products is to be registered, i. e.:

(25.25×1.123=28.35575) +
(25.25×12.12=306.03) +
(25.25×123.1=3108.275) =3,442.66075

The decimal marker 1a of the product register 1 is set between the fifth and sixth order numeral wheels. This provides five decimal places and is the sum of the decimal places of the multiplicand and the multiplier with the largest number of decimal places and is the maximum number of decimal places required for the sum of the products. The decimal marker 19a for the counting register 19 is set between the third and fourth order wheels and provides for three decimal places which is the largest number of decimal places of any of the multipliers. The multiplicand 25.25 is set in the first four orders of the keyboard and the decimal marker 6a is set between the second and third orders to provide for two decimal places. The third position tabulating key 152 is depressed, which number corresponds to the decimal setting of the counting register 19. The carriage is then positioned by shift key 39 so it is to the left of the third position.

Upon simultaneous depression of keys 157, 158, the carriage will be tabulated rightwardly to the third position and the control devices will be adjusted all as heretofore described. Then the multiplier keys 57 representative of the multiplier 1.123 including a decimal key 195 (to be described) will be sequentially depressed from higher to lower orders. Upon depression of the 1 multiplier key, setting and indexing clutch 58 will be engaged. However, when pin 98 of gear 95 (Figs. 6 and 8) is removed from forked arm 99 in the indexing operation, toggle spring 103 (Fig. 2) will be ineffective to initiate the multiplying operation as bail 100 will be held inactive by the superseding control of pin 188a (Figs. 6 and 12) engaging forked arm 99a. Alternatively, cam 58a of clutch 58 will rock and then release arm 194, shaft 122, trigger 123a, and detent 42 of right shift clutch 41a, thereby effecting a one decade carriage shift to the right with the multiplier digit 1 stored in storage magazine 48. The carriage will now be in the fourth position and the decimal key 195 is then depressed.

Figure 12:
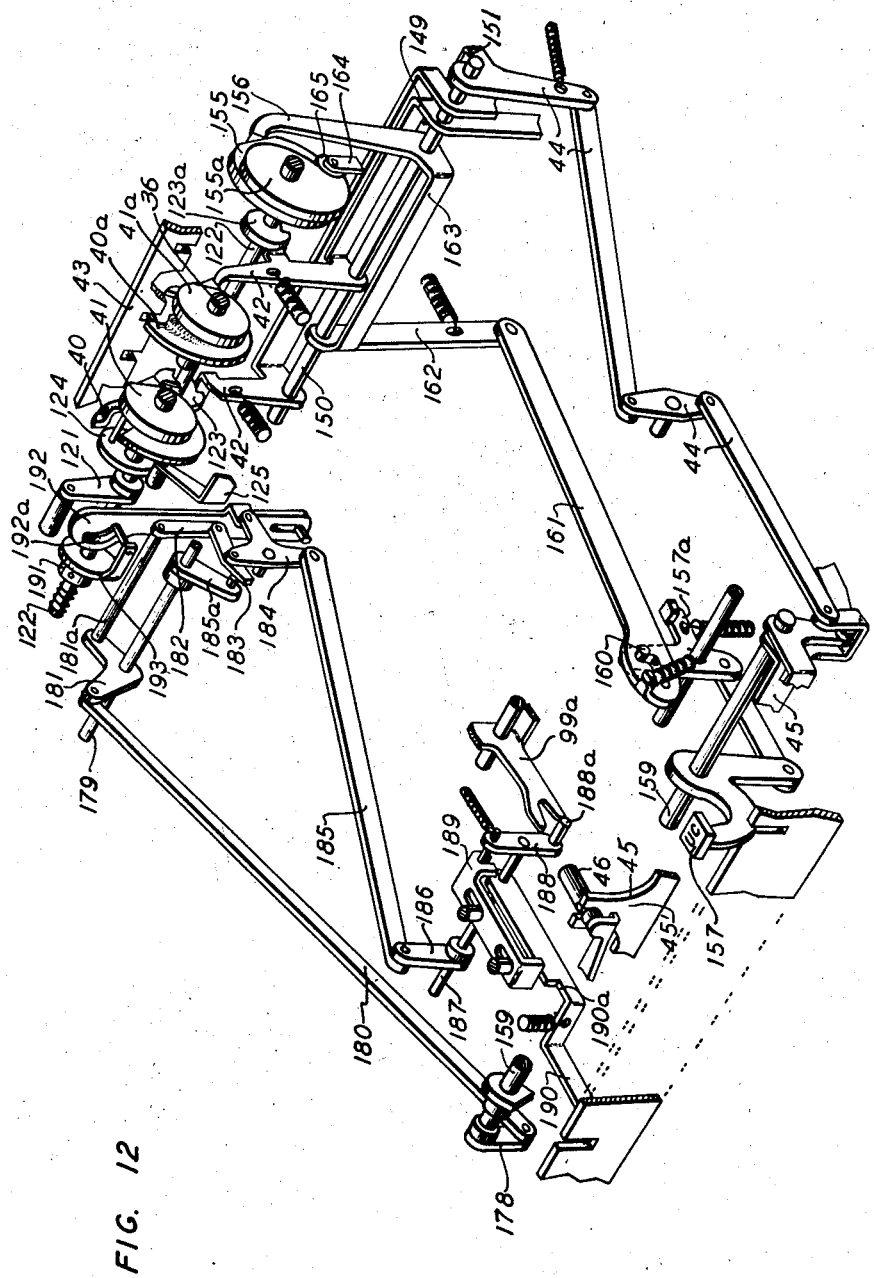
Fig. 12 is a perspective of the carriage position control devices with certain parts broken away and in exploded relationship.

When latching bar 190 was raised from the position shown in Figs. 2 and 12 to latch slide 189, it was moved into engagement with a toe on the under side of the stem of key 195. Therefore, when decimal key 195 is depressed, latching bar 190 will be moved to release slide 189 which will be spring restored to normal. Slide 192 will therefore be lowered and shaft 122 assisted by the spring of collar 191 will be moved to the right, thereby reenabling trigger 123 of left shift clutch 41 and moving the roller of arm 194 (Fig. 2) out of position to be engaged by cam 58a. At the same time crank 183 (Figs. 6 and 12) will be restored clockwise thus removing its pin 188a from forked arm 99a. Pin 98 will have been moved from fork 99 in the indexing operation following the storage of the digit 1. Toggle spring 103 (Fig. 2) will therefore now be effective to rock bail 100 and clutch lever 11 to initiate the multiplying operation. It will be noted that the fork of arm 99a is relatively long and therefore readjustment of shaft 122 and clutch triggers 123, 123a will be effected before bail 100 is released. The 1, 2 and 3 multiplier keys 57 will now be successively depressed and the multiplying operation will be effected in accordance with the disclosure of applicant's application, Serial No. 205,304. It will be recalled that the multiplying operation was initiated upon depression of decimal key 195 with the carriage in the fourth position. Therefore, the registration in product register 1 at the end of the first calculation will be 28.35575.

The carriage will now be returned to the third position for the second calculation upon depression of keys 157, 158. The multiplier keys 1, 2, decimal key 195, multiplier keys 1 and 2 will be successively depressed. The second calculation will therefore be started with the carriage in the fifth position and the registration effected by the second calculation will be 306.03.

The carriage will again be returned to the third position for the last calculation and multiplier keys 1, 2, 3, decimal key, and multiplier key 1, will be successively depressed. The calculation will be started with the carriage in the sixth position and the registration effected will be 3108.275 with the total of 3442.66075 which is the sum of the three products.

It will be apparent that the devices of the invention may well be adapted for use with multiplying mechanism having multiplier storage devices wherein the multiplier digits are successively stored but wherein the calculation is not initiated until the entire multiplier is stored. For example, successive depression of the digit keys for the whole number of the multiplier could effect the decade shifting from the tabulated position, the shifting mechanism could be disabled upon depression of the decimal key and then the digits of the decimal could be entered with the carriage located in the correct position for the initiation of the calculation. Furthermore, the devices of the invention are equally applicable in multiplying mechanism wherein right shift is effected and the multiplier keys are depressed from lower to higher orders. In this application of the invention, the carriage position control means would effect left shift from the tabulated position prior to initiation of the calculation. It will be understood therefore that the invention is not to be restricted, except as necessitated by the spirit of the appended claims.

I claim:

1. In a motor driven calculating machine having a shiftable register carriage, means for ordinarily shifting said carriage, differentially settable multiplier storage devices, multiplier keys, and means operable to enter values successively into said storage devices upon sequential depression of a series of said multiplier keys; means for ordinarily locating said carriage, comprising a normally disabled power transmission train adjustable for operation in response to depression of each multiplier key to initiate an ordinal operation of said shifting means, conditioning devices for adjusting said power transmission train to operative position including manually operable control means therefor, a control key, and normalizing devices operable upon depression of said control key to disable said power transmission train.

2. In a motor driven calculating machine having a shiftable register carriage, means for ordinally shifting said carriage, differentially settable multiplier storage devices, multiplier keys, and means operable to enter values successively into said storage devices upon sequential depression of a series of said multiplier keys; means for ordinally locating said carriage, comprising shift control means operable to cause said carriage shifting means to shift said carriage in a given direction to a selected ordinal position, a normally disabled power transmission train adjustable for operation in response to depression of each multiplier key to initiate an ordinal operation of said shifting means in said given direction, conditioning devices for adjusting said power transmission train to operative position, manually operable means for causing operation of said shift control means and of said conditioning devices, a control key, and normalizing devices operable upon depression of said control key to disable said power transmission train.

3. In a motor driven calculating machine having a shiftable register carriage, means for ordinally shifting said carriage, differentially settable multiplier storage devices, multiplier keys, and means operable to enter values successively into said storage devices upon sequential depression of a series of said multiplier keys; means for ordinally locating said carriage, comprising shift control means operable to cause said carriage shifting means to shift said carriage in a given direction to a selected ordinal position, a normally disabled power transmission train adjustable for operation in response to depression of each multiplier key to initiate an ordinal operation of said shifting means in said given direction, manually operable means for initiating operation of said shift control means, conditioning devices operable in response to operation of said shift control means to adjust said power transmission train to operative position, a control key, and normalizing devices operable upon depression of said control key to disable said power transmission train.

4. In a motor driven calculating machine having a shiftable register carriage, means for ordinally shifting said carriage, differentially settable multiplier storage devices, multiplier keys, and means operable to enter values successively into said storage devices including a setting clutch operable upon depression of each of said multiplier keys; means for ordinally locating said carriage, comprising a normally disabled power transmission train adjustable for operation by said setting clutch to initiate an ordinal operation of said shifting means, conditioning devices for adjusting said power transmission train to operative position including manually operable control means therefor, a control key, and normalizing devices operable upon each depression of said control key to disable said power transmission train.

5. In a motor driven calculating machine having a shiftable carriage, a product register on said carriage, differential actuators for said register means for ordinally shifting said carriage in a given or alternatively the opposite direction, differentially settable multiplier storage devices, multiplier keys, means operable to enter values successively into said storage devices upon sequential depression of a series of said multiplier keys concurrently with operation of said actuators and said carriage shifting means, and multiplication control means including said storage devices operable to control operation of said actuators and of said carriage shifting means in said given direction; means for ordinally locating said carriage, comprising a normally disabled power transmission train adjustable for operation in response to depression of each multiplier key to initiate an ordinal operation of said shifting means in said opposite direction, conditioning devices for adjusting said power transmission train to operative position including manually operable control means therefor, a control key, and normalizing devices operable upon depression of said control key to disable said power transmission train and to initiate operation of said multiplication control means.

6. In a motor driven calculating machine having a shiftable carriage, a product register on said carriage, differential actuators for said register, means for ordinally shifting said carriage in a given or alternatively the opposite direction, differentially settable multiplier storage devices, multiplier keys, means operable to enter values successively into said storage devices upon sequential depression of a series of said multiplier keys concurrently with operation of said actuators and said carriage shifting means, and multiplication control means including said storage devices operable to control operation of said actuators and of said carriage shifting means in said given direction; means for ordinally locating said carriage, comprising shift control means operable to cause said carriage shifting means to shift said carriage in said opposite direction to a selected ordinal position, a normally disabled power transmission train adjustable for operation in response to depression of each multiplier key to initiate an ordinal operation of said shifting means in said opposite direction, conditioning devices for adjusting said power transmission train to operative position, manually operable means for causing operation of said shift control means and of said conditioning devices, a control key, and normalizing devices operable upon depression of said control key to disable said power transmission train and to initiate operation of said multiplication control means.

7. In a motor driven calculating machine having a shiftable carriage, a product register on said carriage, differential actuators for said register, means for ordinally shifting said carriage in a given or alternatively the opposite direction, differentially settable multiplier storage devices, multiplier keys, means operable to enter values successively into said storage devices upon sequential depression of a series of said multiplier keys concurrently with operation of said actuators and said carriage shifting means, multiplication control means including said storage devices operable to control operation of said actuators and of said carriage shifting means in said given direction, and means for initiating operation of said multiplication control means upon depression of the first one of a series of said multiplier keys; means for ordinally locating said carriage, comprising shift control means operable to cause said carriage shifting means to shift said carriage in said opposite direction to a selected ordinal position, a normally disabled power transmission train adjustable for operation in response to depression of each multiplier key to initiate an ordinal operation of said shifting means in said opposite direction, conditioning devices for adjusting said power transmission train to operative position and for disabling the initiating means for said multiplication control means, manually operable means for causing operation of said shift control means and of said conditioning devices, a control key, and normalizing devices operable upon depression of said control key to disable said power transmission train and to cause initiation of the operation of said multiplication control means.

8. The invention according to claim 7 wherein the normalizing devices operable upon depression of the control key to cause initiation of operation of the multiplication control means are operable to re-enable the initiating means operable upon depression of said first multiplier key.

9. In a motor driven calculating machine having a shiftable carriage, a product register on said carriage, differential actuators for said register, means for ordinally shifting said carriage in a given or alternatively the opposite direction, differentially settable multiplier storage devices, multiplier keys, means operable to enter values successively into said storage devices upon sequential depression of a series of said multiplier keys concurrently with operation of said actuators and said carriage shifting means, multiplication control means including said storage devices operable to control operation of said actuators and of said carriage shifting means in said given direction, and spring powered means operable in response to depression of the first one of a series of said multiplier keys to initiate operation of said multiplication control means; means for ordinally locating said carriage, comprising shift control means operable to cause said carriage shifting means to shift said carriage in said opposite direction to a selected ordinal position, a normally disabled power transmission train adjustable for operation in response to depression of each multiplier key to initiate an ordinal operation of said shifting means in said opposite direction, conditioning devices operable to adjust said power transmission train to operative position and to restrain said spring powered means from operation, manually operable means for causing operation of said shift control means and of said conditioning devices, a control key, and normalizing means operable upon depression of said control key to disable said power transmission train and to release said spring powered means.

10. In a motor driven calculating machine having a shiftable carriage, a product register on said carriage, differential actuators for said register, means for ordinally shifting said carriage in a given or alternatively the opposite direction, differentially settable multiplier storage devices, multiplier keys, means operable to enter values successively into said storage devices upon sequential depression of a series of said multiplier keys concurrently with operation of said actuators and said carriage shifting means, and multiplication control means including said storage devices operable to control operation of said actuators and of said carriage shifting means in said given direction; means for ordinally locating said carriage, comprising an ordinal series of settable tabulating keys, a shift terminating member adjustable to effective or ineffective position and operable upon movement of said carriage into an ordinal position indicated by a set tabulating key to terminate operation of said shifting means, a normally disabled power transmission train adjustable for operation in response to depression of each multiplier key to initiate an ordinal operation of said shifting means in said opposite direction, conditioning devices for initiating operation of said shifting means in said opposite direction, for adjusting said shift terminating member to effective position, and for adjusting said power transmission train to operative position; manually operable means for causing operation of said conditioning devices, means operable upon movement of said carriage into the ordinal position of a set tabulating key to adjust said shift control member to ineffective position, a control key, and normalizing devices operable upon depression of said control key to disable said power transmission train and to initiate operation of said multiplication control means.

11. In a motor driven calculating machine having a shiftable carriage, a product register on said carriage, differential actuators for said register, means for ordinally shifting said carriage in a given or alternatively the opposite direction, differentially settable multiplier storage devices, multiplier keys, means operable to enter values successively into said storage devices upon sequential depression of a series of said multiplier keys concurrently with the operation of said actuators and of said carriage shifting means including a setting clutch operable upon depression of each of said multiplier keys, and multiplication control means including said storage devices operable to control operation of said actuators and of said carriage shifting means in said given direction; means for ordinally locating said carriage, comprising shift control means operable to cause said carriage shifting means to shift said carriage in said opposite direction to a selected ordinal position including an auxiliary clutch operable to initiate the operation, a normally disabled power transmission train adjustable upon operation of said auxiliary clutch for operation by said setting clutch to initiate an ordinal operation of said shifting means in said opposite direction, manually operable means for causing operation of said shift control means, a control key, and normalizing devices operable upon depression of said control key to disable said power transmission train and to initiate operation of said multiplication control means.

FREDERICK W. PFLEGER.

References Cited in the file of this patent

UNITED STATES PATENTS

| Number | Name | Date |
|---|---|---|
| 1,915,037 | Suter | June 20, 1933 |
| 1,974,494 | Kottmann | Sept. 25, 1934 |
| 2,141,597 | Cunningham | Dec. 27, 1938 |
| 2,382,661 | Pott | Aug. 14, 1945 |
| 2,399,917 | Friden et al. | May 7, 1946 |
| 2,467,419 | Avery | Apr. 19, 1949 |
| 2,538,896 | Britten, Jr. | Jan. 23, 1951 |